(12) United States Patent
Sgambati et al.

(10) Patent No.: US 9,759,083 B2
(45) Date of Patent: Sep. 12, 2017

(54) CRYOGENIC LIQUID EXPANSION TURBINE

(71) Applicants: Stephane Sgambati, Balderscheim (FR); Frank Haensel, Freiburg (DE)

(72) Inventors: Stephane Sgambati, Balderscheim (FR); Frank Haensel, Freiburg (DE)

(73) Assignee: Cryostar SAS, Hesingue (FR)

( * ) Notice: Subject to any disclaimer, the term of this patent is extended or adjusted under 35 U.S.C. 154(b) by 608 days.

(21) Appl. No.: 14/350,831

(22) PCT Filed: Oct. 15, 2012

(86) PCT No.: PCT/IB2012/002063
§ 371 (c)(1),
(2) Date: Apr. 10, 2014

(87) PCT Pub. No.: WO2013/057561
PCT Pub. Date: Apr. 25, 2013

(65) Prior Publication Data
US 2014/0294563 A1  Oct. 2, 2014

(30) Foreign Application Priority Data

Oct. 19, 2011  (EP) .................................. 11352010

(51) Int. Cl.
*F01D 15/00* (2006.01)
*F03B 13/00* (2006.01)

(52) U.S. Cl.
CPC ............ *F01D 15/005* (2013.01); *F03B 13/00* (2013.01); *F05B 2220/60* (2013.01); *F05B 2220/602* (2013.01); *Y02B 10/50* (2013.01)

(58) Field of Classification Search
CPC .................. F03B 13/00; F05B 2220/60; F05B 2220/602; Y02B 10/50; F01D 15/005
See application file for complete search history.

(56) References Cited

U.S. PATENT DOCUMENTS

| 2,282,894 | A | | 5/1942 | Sheldon |
| 3,909,012 | A | | 9/1975 | Denis |
| 5,412,977 | A | * | 5/1995 | Schmohl ................. F01D 11/06 277/318 |
| 5,460,003 | A | | 10/1995 | Nenov |

(Continued)

FOREIGN PATENT DOCUMENTS

WO  WO 2011061142 A1  5/2011

OTHER PUBLICATIONS

W/Intern. Search Report, dated Jan. 30, 2013.
(Continued)

*Primary Examiner* — Mark Laurenzi
*Assistant Examiner* — Shafiq Mian
(74) *Attorney, Agent, or Firm* — Joshua L. Cohen

(57) ABSTRACT

A cryogenic liquid expansion turbine has a turbine wheel mounted on a rotary shaft, at least one radial inlet for cryogenic liquid to be expanded in the expansion turbine for the rotary shaft, and a dry gas sealing means at a position along the rotary shaft between the turbine wheel and the bearings. There is a thermal barrier member between the turbine wheel and the dry gas sealing means, a gas chamber on the dry gas sealing means side of the thermal barrier member, and an internal passage for cryogenic gas to the said gas chamber. A method is also provided.

16 Claims, 3 Drawing Sheets

(56) References Cited

U.S. PATENT DOCUMENTS

| | | | | |
|---|---|---|---|---|
| 6,439,836 | B1* | 8/2002 | Pozivil | F01D 15/005 415/110 |
| 6,789,804 | B2* | 9/2004 | Wilhelm | F16J 15/38 277/345 |
| 2005/0242515 | A1* | 11/2005 | Brooks | F16J 15/3464 277/370 |
| 2006/0039791 | A1* | 2/2006 | Kim | F01D 5/048 416/228 |
| 2011/0305558 | A1* | 12/2011 | Omori | F04D 17/12 415/122.1 |
| 2013/0091869 | A1* | 4/2013 | Bardon | F01D 15/005 62/6 |
| 2013/0129471 | A1* | 5/2013 | Gupta | F04D 29/104 415/1 |
| 2013/0160455 | A1* | 6/2013 | Leconte | F01D 1/02 60/772 |

OTHER PUBLICATIONS

Intern'l Search Rpt for PCT/IB2012/002063 and Written Opinion of Intern'l Searching Authority, dated Jan. 30, 2013, Authorized Officer: F. Criado Jimenez, 7 pp.

R. Damback, Reliable Criteria for the Selection of Flashing Liquid Expanders, GPA Europe Conference, Feb. 25, 2010, pp. 1-13, Hesingue, France.

* cited by examiner

CRYOGENIC LIQUID EXPANSION TURBINE

BACKGROUND OF THE INVENTION

This invention relates to a cryogenic liquid expansion turbine.

A cryogenic liquid turbine is well known in the art of cryogenic engineering as, in certain circumstances, an alternative or adjunct to a Joule-Thomson valve.

Even though the turbine operates at a cryogenic temperature, the machine typically has axially disposed components that operate at or above ambient temperatures, particularly a bearing or bearings for supporting a rotary shaft to which the turbine wheel is mounted. In theory, the most thermodynamically efficient cryogenic liquid expansion turbines are those that employ radial fluid inflow. In practice, however, there is a tendency for such effects as undesirable heat flows or formation of a second vapour phase as a result of flashing, or a failure to achieve readily adequate sealing at a bearing between parts at cryogenic temperatures and parts at higher temperatures, to lead to alternative forms of expansion turbine or a Joule-Thomson valve to be chosen instead of a radial inlet liquid expansion turbine.

SUMMARY OF THE INVENTION

According to the present invention, there is provided a cryogenic liquid expansion turbine having a turbine wheel mounted on a rotary shaft, at least one radial inlet for cryogenic liquid to be expanded in the expansion turbine, at least one bearing for the rotary shaft, and a dry gas sealing means at a position along the rotary shaft between the turbine wheel and the said bearing, characterised in that there is a thermal barrier member between the turbine wheel and the dry gas sealing means, a gas chamber on the dry gas sealing means side of the thermal barrier member, and an inlet for cryogenic gas to the said gas chamber.

The dry gas sealing means typically has an inlet for dry non-cryogenic gas in addition to the said inlet for cryogenic gas.

The turbine wheel may be adapted to allow the cryogenic liquid to flash during its expansion.

In a flashing cryogenic liquid turbine according to the invention, the forward face of the turbine wheel is typically scalloped. Such a configuration of the turbine wheel is believed to reduce liquid friction on the wheel.

The gas chamber typically has a first exit for cryogenic gas to the turbine wheel.

The said first exit is typically through a first labyrinth seal, so as to limit the flow of gas therethrough.

The gas chamber typically also has a second exit for cryogenic gas communicating with the dry gas sealing means via a second labyrinth seal.

The dry gas sealing means is typically a dry gas seal, for example, a single dry gas seal or a tandem dry gas seal.

Typically, there is a first vent from the dry gas sealing means communicating with a flare. Alternatively, the first vent may communicate with the external atmosphere or with a gas recovery means. In addition, there may be a second vent from the dry gas sealing means communicating with the external atmosphere.

In one preferred embodiment, the bearing is an oil bearing, and the dry gas sealing means is protected from oil vapour by further shaft sealing means comprising a plurality of axially-spaced carbon rings. The space between the said carbon rings typically communicates with a source of dry non-cryogenic gas. In other embodiments, the bearing is a gas bearing or a magnetic bearing.

A cryogenic liquid turbine according to the invention may be coupled to an electrical generator or a mechanical brake. The mechanical brake can be of any convenient form, for example, a compressor wheel or oil brake.

The invention also provides a method of operating the said cryogenic liquid turbine, wherein a portion of the cryogenic liquid is vaporised so as to form the said cryogenic gas.

A pressure typically in the range of from 5 bar to 10 bar is maintained in the gas chamber.

The cryogenic liquid is typically natural gas, but can alternatively be another cryogenic liquid such as liquid nitrogen or liquid air.

A temperature in the range minus 100° C. to minus 150° C. is typically maintained in the gas chamber if the cryogenic liquid is natural gas. The temperature may be regulated to be the minimum, or a little above the minimum, at which the fluid in the chamber is entirely gaseous at the operating pressure of the chamber.

Typically, at least 90% of the said cryogenic gas exits the gas chamber to the turbine wheel.

BRIEF DESCRIPTION OF THE DRAWINGS

The cryogenic liquid expansion turbine according to the invention will now be described by way of example with reference to the accompanying drawings, in which.

The drawings are not to scale.

DETAILED DESCRIPTION OF THE INVENTION

Figure 1:
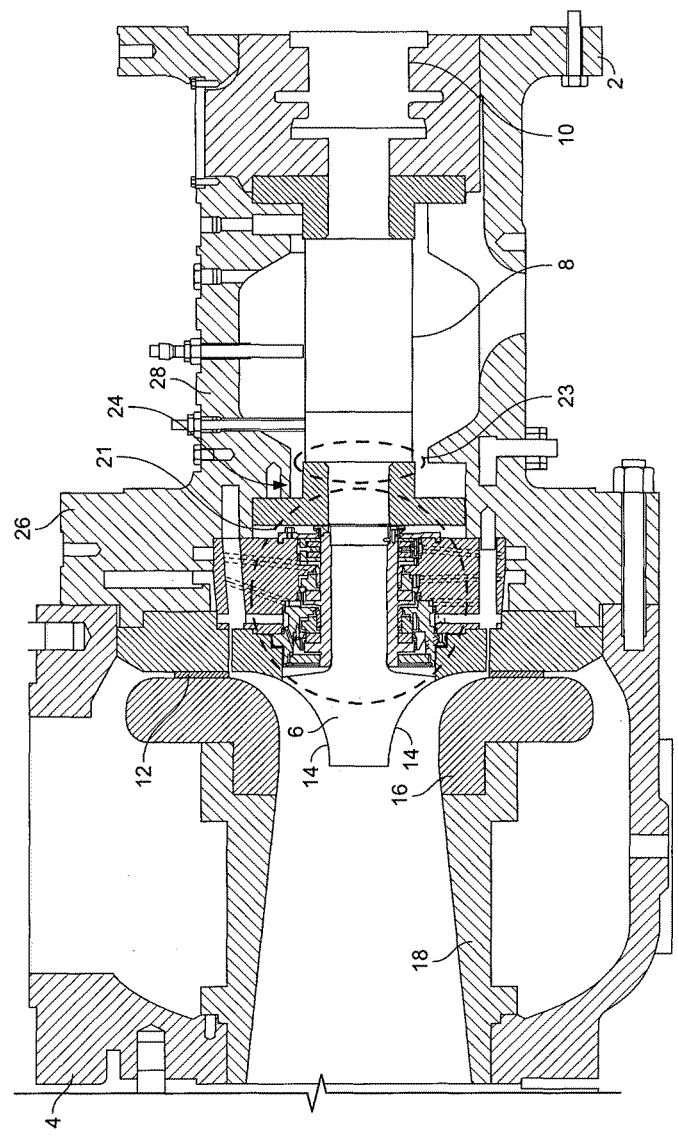
FIG. 1 is a schematic side elevation, partly in cross-section, of a flashing cryogenic liquid expansion turbine according to the invention.

Referring to FIG. 1, there is shown a cryogenic liquid expansion turbine which operates with a part of the liquid flashing to vapour. The turbine has an inlet flange 2 which is connected to a pipe (not shown) communicating with a source (not shown) of cryogenic liquid to be expanded. The turbine also has an outlet flange 4 which is connected to an outlet pipe (not shown) to conduct away from the turbine the expanded cryogenic fluid.

The expansion turbine has a turbine wheel 6 mounted to one end of a rotary shaft 8. The other end of the shaft 8 has mounted on it a coupling 10 through which the turbine may, for example, be coupled to, for example, an electrical generator (not shown). The expanding cryogenic liquid causes the turbine wheel to rotate the shaft at a high rotary velocity and can do work by, for example, the generation of electricity. The expansion turbine has a series of radial inlets 12, defined by inlet guide vanes in a manner well known in the art, so as to accelerate a flow of the cryogenic liquid to be expanded. In operation, the flow of liquid from the inlets 12 expands over a forward rotary face 14 of the turbine wheel 6 and passes through channels defined between the face 14 and a static shroud 16 to a static diffuser 18 communicating with the outlet flange 4. The inlet guide vanes can be operated in a conventional manner by a pneumatic actuator (not shown) via a lever system (not shown).

In operation, the cryogenic liquid flowing over the forward face 14 of the turbine wheel 6 is caused to flash. (The forward face is the one that is on the side of the outlet of the turbine.) The liquid flashes because it is rapidly expanded to a pressure below that of the saturated liquid line. A flashing liquid turbine offers the advantage of being able to expand the liquid to a lower pressure and/or require less sub-cooling of the cryogenic liquid at the inlet than liquid turbine expanders without flashing. The extracted work from the fluid to the machine is notably increased when flashing occurs inside the turbine. The gas exit temperature is lower and a higher power recovery is made possible. For example, a generator (not shown) may be installed and the power recovered at the terminals of the generator.

Figure 3:
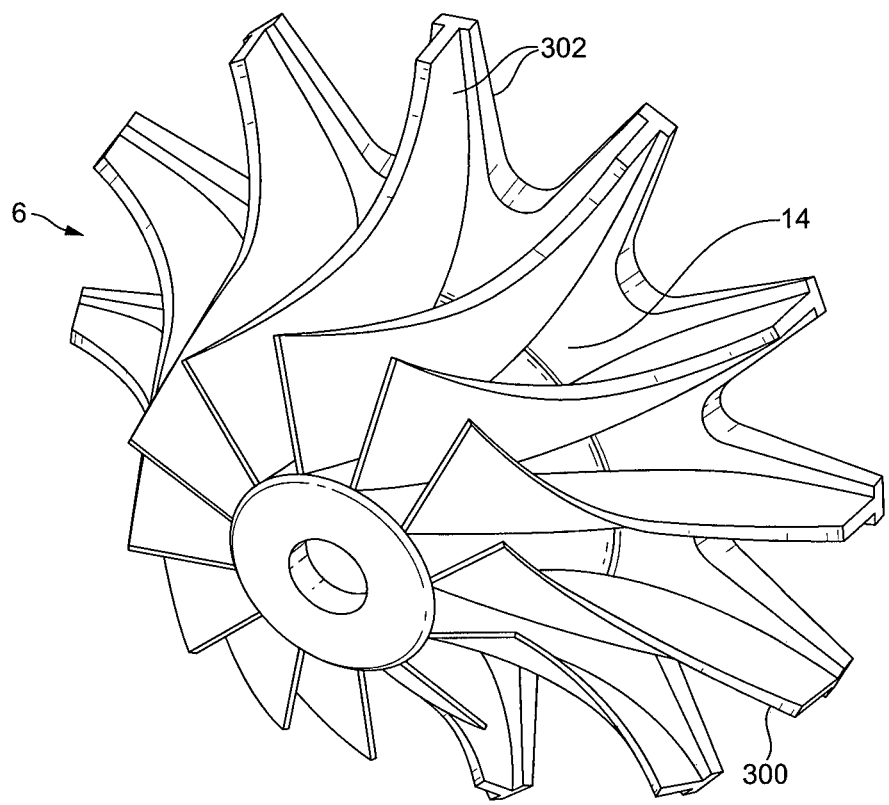
FIG. 3 is a schematic perspective view of the turbine wheel of the turbine shown in FIGS. 1 and 2.

A typical turbine wheel 6 is shown in FIG. 3. The turbine wheel typically has sixteen static blades of a conventional form. The face 14 of the turbine wheel 6 has grooves 302 between each pair of blades 300. The grooves 302 give the turbine wheel 6 a scalloped appearance. Scalloping can reduce the risk of resonance and fatigue failure of the turbine wheel 6 in use. Scalloping also enhances the mechanical performance of the turbine wheel 6 when two phases are present and also, at the design stage, makes the value of the axial thrust predictable.

Referring again to FIG. 1, the region where oil bearings are located is shown in FIG. 1 by the reference 23. This region is situated at an intermediate location between the turbine wheel 6 and the coupling 10. The shaft 8 is provided at the region 23 with a pair of oil bearings (not shown). One oil bearing is a tilting pad oil bearing. Tilting pad oil bearings offer the advantage of having a long operating life. The other oil bearing is a taper-laid thrust oil bearing. The tilting pad oil bearing is a radial bearing and the taper-laid thrust oil bearing is an axial bearing. Oil (or other lubricant) is supplied to the bearings via an injector passage 24 from a reservoir (not shown) external to the expansion turbine. The oil injector passage 24 is formed in a bearing carrier 26 which forms part of a housing 28 for the turbine.

Figure 2:
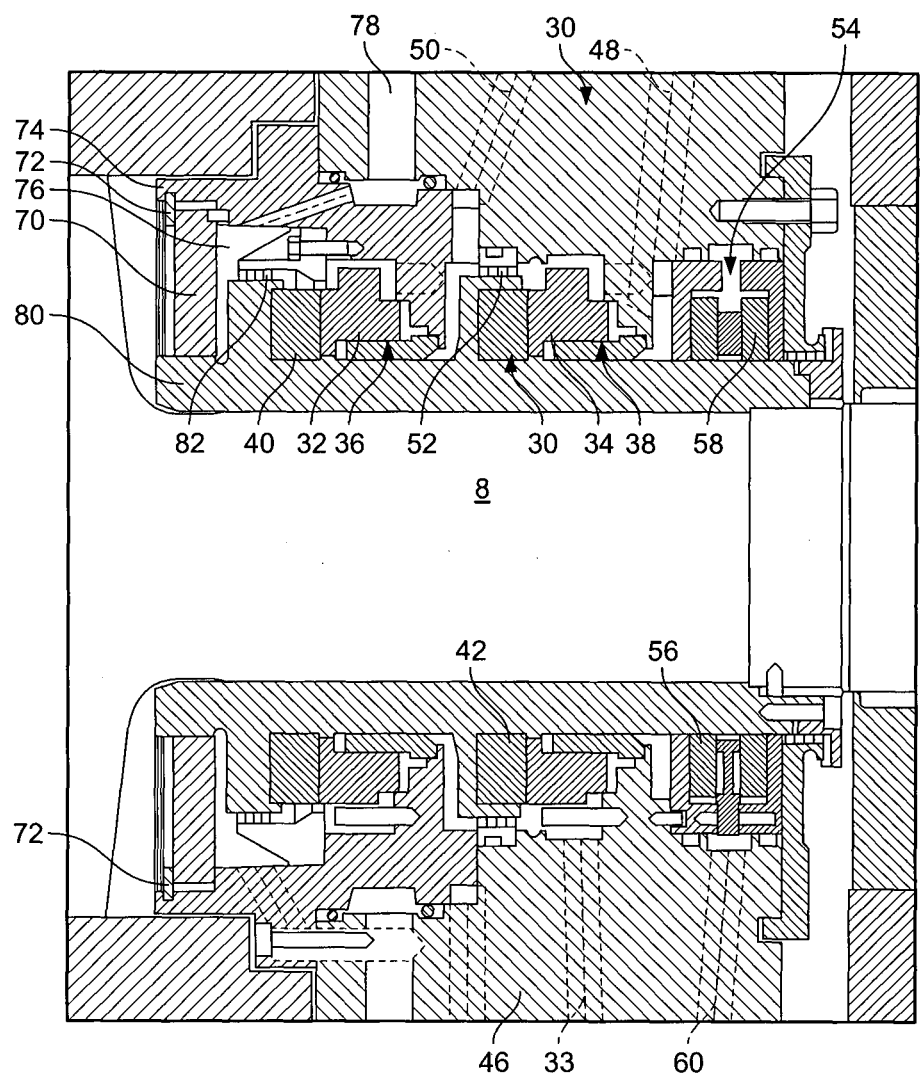
FIG. 2 is a more detailed view of the sealing arrangements in the turbine shown in FIG. 1.

The region where gas seals are located is indicated in FIG. 1 by the reference 21. The gas seals are shown in FIG. 2. Referring to FIG. 2, a tandem dry gas seal 30 is located around the shaft 8 and isolates the turbine wheel 6 from the oil or other lubricant applied to the bearings. Accordingly, no oil vapour or alternative lubricant is allowed to pass along the shaft 8 from the bearings to the forward face 14 of the turbine wheel 6. Thus, the tandem dry gas seal separates the cryogenic part of the machine (where the cryogenic liquid is expanded and flashed) from the warm part where oil lubricates the bearings. (It is not necessary to use oil lubricated bearings. They can alternatively be gas bearings or magnetic bearings.)

Dry gas seals are non-contacting, dry-running mechanical face seals comprising a mating rotary ring and a primary, stationary ring. When operating, grooves in the rotating ring generate a fluid-dynamic force causing the stationary ring (or sleeve) to separate from the rotary ring, thereby creating a gap between the rotary and static rings. This gap can be filled by a suitable gas which is non-reactive such as nitrogen. The pressure in the seal prevents the migration of oil vapour to the turbine wheel. The grooves in the rotating ring direct gas inwards towards the non-grooved portion. In FIG. 2, the individual seals 36 and 38 are essentially identical to one another. The rotary rings (in which the grooves are not shown) are indicated by the reference numerals 40 and 42, respectively, while the stationary rings are indicated by the references 32 and 34, respectively. The seal gas comes from two different sources. First, dry gaseous nitrogen is supplied at about ambient temperature (e.g. 20° C.) from a source (not shown) external to the expansion turbine along an internal passage 33 in a seal carrier unit 46. This gas provides the sealing gas for the dry gas seal 38. Some gas is vented from the seal via a further passage 48 in the seal carrier unit 46. Unlike the seal 38, the dry gas seal 36 employs cryogenic gas. Gas is also vented from the seal 36 via a yet further internal passage 50 in the seal carrier unit 46. The passage 50 communicates with an external flare (not shown) which enables the vented natural gas to be disposed of in a safe manner. Upstream of the passage 50 the natural gas is diluted by some of the nitrogen seal gas from the dry gas seal 38 which seeps through a labyrinth seal 52 intermediate the two seals 36 and 38.

Other parts of the tandem dry gas seal 30 are not described herein, being essentially of conventional configuration and function.

The shaft 8 of the expansion turbine is provided with a further gas seal 54 in a position between the tandem dry gas seal 30 and the oil bearings 20 and 22. The further gas seal 54 is intended to keep to a minimum the leakage of oil vapour to parts of the turbine operating at cryogenic temperatures in the event of a failure of the dry gas seal 30. The further gas seal comprises a pair of axially disposed carbon rings 56 and 58. The radial space between the rings 56 and 58 is fed via a passage 60 in the seal carrier unit in communication with an external source (not shown) of nitrogen, typically, at about ambient temperature (e.g. 20° C.). At least some of the nitrogen may be vented from the gas seal 54 via the passage 48.

Typically the oil bearings operate at a temperature in the order of 60° C. By supplying cryogenic gas to the tandem dry gas seal 30, the cryogenic turbine is thermally isolated from the relatively high temperature bearings, thereby facilitating the efficient operation of the cryogenic turbine. The thermal separation of cryogenic and non-cryogenic parts of the machine is enhanced by the presence, in accordance with the invention, of radial, thermal barrier member 70 in the form of an annular body of a material of low thermal conductivity. The thermal barrier member 70 is secured by bolts 72 or similar members to a part of a housing 74 for the cryogenic dry gas seal 36. The thermal barrier member 70 forms a wall of a chamber 76 through which the cryogenic gas for the dry gas seal 36 passes, the cryogenic gas being supplied from an external source (not shown) via a further internal passage 78 in the seal carrier unit 46. The internal face of the thermal barrier member 70 engages the corresponding surface of a sleeve 80 on the shaft 8 through a further labyrinthine seal (not shown). The arrangement is such that there are two exit routes for cryogenic gas supplied to the chamber 76. One is through the labyrinthine seal that is provided between the thermal barrier member 70 and the sleeve 80 and leads to the back of the turbine wheel 6. Any gas taking this exit route passes over the outer periphery of the turbine wheel 6 and joins the cryogenic liquid being expanded, in one, by operation of the turbine. The other exit route is through a labyrinth seal 82 to the cryogenic dry gas seal 36. In operation, the pressure in the gas seal 36 is maintained sufficiently high for most (typically about 95%) of the cryogenic gas admitted to the chamber 76 to pass to the turbine wheel 6 via the labyrinth seal that is provided between the thermal barrier member 70 and the sleeve 80. If this gas is formed by vaporisation of the process liquid to be expanded in the turbine, loss of the vapour of the process liquid through the tandem dry gas seal 30 is kept down. Typically, the process liquid is liquefied natural gas and the temperature in the chamber 76 is able to be maintained in operation at a temperature in the range of minus 100° C. to minus 150° C. In a typical example, natural gas vapour is supplied to the chamber 76 at a temperature in the order of minus 145° C. Some of the gas from the chamber 76 seeps through the labyrinth seal 82 to the cryogenic dry gas seal 36. The pressure and temperature of the process gas introduced under pressure into the chamber 76 are controlled and maintained (a little) above the dew point to avoid any damage to the dry gas seal faces 36.

The presence of the thermal barrier member reduces the rate at which heat is lost from the cryogenic dry gas seal 36 and thus avoids any recondensation of the cryogenic gas between the faces of the cryogenic dry gas seal 36. The thermal barrier member 70 also helps to limit cold thermal shocks during cool down of the machine at start up.

The turbine wheel 6 is typically cast from a suitable aluminium alloy (i.e. an alloy based on aluminium), but may also be made of titanium or an alloy of titanium, particularly if there is risk of erosion, or if the turbine is to operate with a high torque transmission or a high level of flashing.

The turbine wheel 6 may be connected to the shaft 8 by means of a Hirth coupling. The shaft 8 it self may be formed of a martensitic stainless steel adapted to withstand temperatures as slow as minus 196° C. Other components, such as the bearing carrier 26, the seal carrier unit 46 and the housing 74 may be made of materials that have the necessary engineering strength and that are capable of withstanding the range of temperatures to which they are subjected during use. Stainless steel or titanium is a typical choice of a material for the manufacture of these components.

The thermal barrier member 70 is typically formed of a material of particularly low thermal conductivity (e.g. in the order of 0.5 W/m/° C.), for example, an epoxy laminate with suitable mechanical and thermal properties. Alternative materials include low thermal conductivity graphite-impregnated resins.

The cryogenic liquid expansion turbine according to the invention is able to employ a single stage of expansion and is advantageous over known plural stage expanders for a number of reasons. First, heat from bearing and other frictional losses is not passed onto the process fluid. Elimination of this heat source may result in a lower discharge temperature from the turbine and in a generally improved performance. Second the turbine wheel can be rotated at a fixed, or predetermined, speed. Third, the inlet guide vanes can be configured, in a manner well known in the art, to allow for a large variation of flow across the expansion turbine while maintaining a reasonably high efficiency. Fourth, the expansion turbine can employ a number of standard components of high operational reliability. Fifth, the turbine wheel can handle a wide range of different expansion ratios. Sixth, a single stage cryogenic turbine has fundamentally better operating efficiencies than a plural stage one because there is less functional loss in the former as a result of a shorter flow path through the machine.

A cryogenic liquid expansion turbine according to the invention also has advantages over a Joule-Thomson valve in that work can be recovered from the former but not readily from the latter, and in that a cryogenic liquid expansion turbine will achieve a lower outlet temperature for a given inlet temperature.

If desired, a cryogenic liquid expansion turbine according to the invention may be operated as parallel with a Joule-Thomson valve, for example, in a natural gas liquefaction plant, leading to the possibility of gaining increased process efficiency and to additional recovery of electrical power when the turbine is coupled to an electrical generator.

In typical operation, the cryogenic liquid may be supplied under a pressure selected from a wide range, for example 10 to 80 bar. The outlet pressure may be from 1 to 10 bar depending on the inlet pressure. These ranges are typical and can be extended.

What is claimed is:

1. A cryogenic liquid expansion turbine having a turbine wheel mounted on a rotary shaft, at least one radial inlet for cryogenic liquid to be expanded in the expansion turbine, at least one bearing provided at the rotary shaft, and a dry gas sealing means at a position around the rotary shaft between the turbine wheel and the said at least one bearing, comprising:
   a thermal barrier member between the turbine wheel and the dry gas sealing means,
   a gas chamber positioned on a same side of the thermal barrier member as the dry gas sealing means,
   an inlet for cryogenic gas to the gas chamber,
   a first exit for cryogenic gas from the gas chamber to the turbine wheel,
   wherein the first exit is through a first labyrinth seal; and
   wherein the gas chamber comprises a second exit for the cryogenic gas communicating with the dry gas sealing means through a second labyrinth seal.

2. The cryogenic liquid expansion turbine according to claim 1, wherein the dry gas sealing means comprises another inlet for dry non-cryogenic gas, and said inlet for the cryogenic gas.

3. The cryogenic liquid expansion turbine according to claim 1, wherein the turbine wheel is adapted to allow the cryogenic liquid to flash during its expansion.

4. The cryogenic liquid expansion according to claim 3, wherein the turbine wheel is scalloped.

5. The cryogenic liquid expansion turbine according to claim 1, wherein the dry gas sealing means is a dry gas seal.

6. The cryogenic liquid expansion turbine according to claim 1, wherein the dry gas sealing means is a tandem dry gas seal.

7. The cryogenic liquid expansion turbine according to claim 1, wherein the dry gas sealing means is a single dry gas seal.

8. The cryogenic liquid expansion turbine according to claim 1, further comprising a first vent from the dry gas sealing means, the first vent communicating with at least one of a flare, an external atmosphere, and a gas recovery means.

9. The cryogenic liquid expansion turbine according to claim 8, further comprising a second vent from the dry gas sealing means, the second vent communicating with the external atmosphere.

10. The cryogenic liquid expansion turbine according to claim 1, wherein the at least one bearing is an oil bearing and further comprising shaft sealing means including a plurality of axially-spaced carbon rings for protecting the dry gas sealing means from oil vapour.

11. The cryogenic liquid expansion turbine according to claim 10, wherein space between the plurality of axially-spaced carbon rings is in communication with a source of dry non-cryogenic gas.

12. The cryogenic liquid expansion turbine according to claim 1, wherein the at least one bearing is selected from the group consisting of an oil bearing and a gas bearing.

13. A method of operating a cryogenic liquid expansion turbine having a turbine wheel mounted on a rotary shaft, at least one radial inlet for cryogenic liquid to be expanded in the expansion turbine, at least one bearing provided at the rotary shaft, and a dry gas sealing means at a position around the rotary shaft between the turbine wheel and the said at least one bearing, comprising:
- providing a thermal barrier member between the turbine wheel and the dry gas sealing means,
- providing a gas chamber positioned on a same side of the thermal barrier member as the dry gas sealing means,
- providing an inlet for cryogenic gas to the gas chamber,
- vaporizing a portion of a cryogenic liquid for forming the cryogenic gas, and
- exhausting at least 90% of the cryogenic gas from the chamber through a first exit to the turbine wheel,
- wherein the first exit is through a first labyrinth seal; and
- wherein the gas chamber comprises a second exit for the cryogenic gas communicating with the dry gas sealing means through a second labyrinth seal.

14. The method of operating the cryogenic liquid expansion turbine according to claim 13, further comprising maintaining a pressure in the gas chamber in a range of from 5 bar to 10 bar.

15. The method of operating the cryogenic liquid expansion turbine according to claim 14, further comprising regulating a temperature of the cryogenic gas to maintain a single gaseous phase in the gas chamber.

16. The method of operating the cryogenic liquid expansion turbine according to claim 13, wherein the cryogenic liquid is selected from the group consisting of natural gas, liquid nitrogen and liquid air.

* * * * *